United States Patent [19]

Gibbon

[11] 4,123,490
[45] Oct. 31, 1978

[54] PRODUCTION OF A HIGH TENACITY, LOW DENIER POLY(ETHYLENE TEREPHTHALATE) FIBRILLATED TAPE YARN

[75] Inventor: John D. Gibbon, Charlotte, N.C.

[73] Assignee: Fiber Industries Inc., Charlotte, N.C.

[21] Appl. No.: 633,758

[22] Filed: Nov. 20, 1975

[51] Int. Cl.² .......................... B29D 7/04; B29D 7/24; B29C 17/14; D02G 1/16
[52] U.S. Cl. ................................. 264/147; 264/210 R; 264/DIG. 47; 425/461
[58] Field of Search ........... 264/147, 171, 177, 210 R, 264/237, 288, DIG. 8, DIG. 47; 260/873; 425/461, 465

[56] References Cited

U.S. PATENT DOCUMENTS

| | | | |
|---|---|---|---|
| 1,952,038 | 3/1934 | Fischer | 264/177 R |
| 1,956,564 | 5/1934 | Crane et al. | 264/177 R |
| 2,698,463 | 1/1955 | Conwell et al. | 264/210 R |
| 2,945,739 | 7/1960 | Lehmicke | 425/461 |
| 3,164,948 | 1/1965 | Stratford | 264/177 R |
| 3,574,809 | 4/1971 | Fairbanks et al. | 264/177 R |
| 3,707,837 | 1/1973 | Gibbon | 57/157 F |
| 3,751,209 | 8/1973 | Schreiber | 264/177 R |
| 3,860,383 | 1/1975 | Sirevicius | 425/817 C |
| 3,915,606 | 10/1975 | Straub et al. | 425/461 |

Primary Examiner—James B. Lowe
Attorney, Agent, or Firm—Roderick B. Macleod; Pamela D. Kasa

[57] ABSTRACT

A low denier, high tenacity poly(ethylene terephthalate) fibrillated tape yarn particularly suited for conversion into a sewing thread which exhibits excellent sewing performance is produced by intimately mixing poly(ethylene terephthalate) polymer with from about 0.1 to 20 percent polypropylene based on the weight of poly(ethylene terephthalate), extruding the polymer mixture in the form of a tape through a slit die having a modified entry port wherein the depth of the slit is greater at both ends than at the middle, at a melt draw down of from about 26:1 to about 75:1, quenching said tape, hot drawing said tape in two stages wherein said tape is initially hot drawn to a draw ratio of from about 3.3 to about 4.2 while being subjected to a temperature of from about 80° to about 140° centigrade, thereafter hot drawing to a total draw ratio of about 5.0 while heated to a temperature about 160° and thereafter subjecting the tape to fibrillation. A slit die with a modified entry port which allows extrusion of a low denier tape at high draw down ratios is also disclosed.

17 Claims, 13 Drawing Figures

PRODUCTION OF A HIGH TENACITY, LOW DENIER POLY(ETHYLENE TEREPHTHALATE) FIBRILLATED TAPE YARN

BACKGROUND OF THE INVENTION

1. Field of the Invention

The invention herein relates to a fibrillated tape yarn.

It further relates to a high tenacity, low denier poly(ethylene terephthalate) fibrillated tape yarn and more particularly to a high tenacity, low denier poly(ethylene terephthalate) fibrillated tape yarn particularly suited for conversion into a sewing thread.

The invention also relates to an improved process for producing poly(ethylene terephthalate) fibrillated tape yarn.

Additionally, this invention relates to an extrusion die for the production of low denier fibrillated tape yarns and more particularly to an extrusion die which eliminates draw resonance in the extruded tape.

2. Prior Art

Synthetic yarns have found wide acceptance in the textile industry on the basis of their many superior properties when compared to natural fibers. Synthetic yarns, both from fibers and continuous filaments, are employed in the production of fabrics for the complete spectrum of end uses including apparel, home furnishing as, and industrial application.

Sewing thread, however, which is used in almost all the processes which convert textiles to a particular end-use product has, until recently, been exclusively a natural, and particularly a cotton product.

The spun cotton yarn dominated the sewing thread market because of its desirable bulk, pleasant soft feel in the fabric seams, a desirable appearance, and, most significantly its good sewing performance.

"Good sewing performance" is a general term which reflects the ability of a thread to sew smoothly and evenly, avoiding splintering, breakage, and snarls during the sewing process. While a multitude of undefined factors are believed to affect sewing performance, good loop formation, resistance to melting and/or fusion under conditions of use, and freedom from knots, slubs, and other irregularities are believed to contribute heavily to good sewing performance.

While exhibiting good sewing performance cotton yarns are not without disadvantages, though, such as relatively low strength, poor whiteness retention on exposure to heat, and an undesirable reaction to finishing chemicals.

Previous attempts to develop a sewing thread yarn with the advantages of cotton but without its drawbacks have not met with complete success. Poly(ethylene terephthalate) yarn has achieved some commercial acceptance as an alternative to cotton sewing thread but until the development of the yarn of this invention, poly(ethylene terephthalate) sewing threads exhibited disadvantageous properties of their own.

Previously known poly(ethylene terephthalate) staple sewing thread suffers from excessively high shrinkage requiring stabilization prior to use to avoid seam puckering as well as necessitating the same staple processing as cotton fiber, while poly(ethylene terephthalate) sewing thread produced from continuous filaments is too lean causing an undesirable sleazy feel and slippage in the fabric during the sewing operation resulting in seam puckering. Additionally, both versions of the prior art poly(ethylene terephthalate) threads are subject to fusion of the thread in some sewing operations.

By the invention herein it was discovered that a poly(ethylene terephthalate) fibrillated tape yarn could be produced which avoided many of the specific disadvantages of both the staple and continuous filament forms of poly(ethylene terephthalate) sewing thread and additionally exhibited good sewing performance.

In prior patent applications U.S. Ser. No. 72,710 of co-inventor Gibbon, filed Sept. 16, 1970, now abandoned, and U.S. Ser. No. 70,718 also of Gibbon, filed Sept. 9, 1970 and now U.S. Pat. No. 3,707,837 there is disclosed a process for producing a polyester fibrillated tape yarn by extruding a mixture of poly(ethylene terephthalate) and from about 0.1 to about 25% (by weight of polyester) of polypropylene into tapes followed by a two stage draw process and fibrillation, preferably with air operated false twisting jets.

Fibrillation processes and specifically those teaching the inclusion of an incompatible polymer to initiate fibrillation are known in the art. However, the successful application of these processes was limited to the production of polypropylene yarns. The applicant, as disclosed in the aforementioned applications, discovered that a fibrillatable poly(ethylene terephthalate) product could be produced by extruding a poly(ethylene terephthalate) tape with a minor amount of polypropylene dispersed throughout the tape and thereafter hot drawing at a temperature of from about 80° to about 140° centigrade and further hot drawing at a temperature of from about 120° to about 230° centigrade. This precursor tape could then be fibrillated to a yarn product by conventional mechanical fibrillation means including twisting, rubbing, brushing, gas or solids impingement, etc.

A particularly preferred fibrillation process is disclosed in the aforementioned U.S. Pat. No. 3,707,847 for fibrillating a fibrillatable tape at windup speeds in excess of 500 feet per minute. In this process the tape is subjected to the action of at least four fluid twisting means wherein the direction of twist imparted to the tape is completely and sharply reversed between adjacent twisting means and the tape is advanced from one fluid twisting means to another while being maintained under a tension of from about 0.05 to about 0.5 grams per denier.

While this process was successful in producing a poly(ethylene terephthalate) fibrillated product its application was limited to the production of yarns of relatively high denier (above 500) and intermediate tenacity (2–4 gpd), and hence this process would not produce the low denier, low denier per filament, high tenacity yarn which is particularly desirous for a sewing thread product.

Low denier fibrillated yarns could be achieved in principle by slitting a cast polyester film followed by drawing and fibrillation. However, casting a film thin enough to produce the desired denier per filament, which is controlled by film thickness, is extremely difficult to achieve. The difficulty is further compounded by the problems involved in slitting polyester film.

Production of low denier fibrillated yarn by the process disclosed in the aforementioned prior applications proved unsatisfactory because of the occurrence of draw resonance at the high melt draw down ratio necessary to produce a low denier product. Draw resonance is a phenonmenon which results in a cyclic variation in both the thickness and width of an extruded tape with the dimensional variations occurring in phase with each other.

When one extrudes then draws a thermoplastic shape into a quenching medium and increases the drawing speed continuously, the cross-sectional area of the extrudate, in the air gap between the die and coolant, will become smaller. At a critical take-up speed, a cyclic gauge pulsation appears in the extrudate and becomes more pronounced as the drawing speed is increased until it eventually breaks at the air-coolant interface. The cause of the oscillation is believed to be complex and related to drawing speed, air gap size, melt temperature and molecular weight of the polymer extrudate, among others. The only known method of prevention was to lower the melt draw down ratio or provide a method of cooling slower than the water quench.

Neither of these methods would prove satisfactory in the fibrillation process disclosed herein.

Production of a low denier fibrillatable tape with a lower melt draw down ratio would necessitate narrowing of the extrusion slit or reducing the slit length. However, it is impractical to manufacture a die with a slit less than about 0.005 inch wide. Even if such a die were able to be produced, it would rapidly clog during extrusion with particles present in the polymer melt. Reduction of the slit length produces thicker tapes which fibrillate to a coarse denier per filament making them undesirous for the end use contemplated here.

Rapid quench of the extrudate is necessary to the fibrillation process as more fully set forth hereinafter and thus eliminates slower cooling as a solution to draw resonance in the process herein.

SUMMARY OF THE INVENTION

In accordance with the method of this invention a novel low denier, high tenacity poly(ethylene terephthalate) fibrillated tape yarn is produced by extruding a poly(ethylene terphthalate)/polypropylene polymer mixture of about 0.1 to 20 percent polypropylene through a modified slit die wherein the depth of the die slit is greater at the ends than at the center, melt drawing the extrudate at a ratio from about 26:1 to 75:1, rapidly quenching the extrudate to maintain a uniform polypropylene dispersion and thereafter drawing the tape in two stages and fibrillating preferably in accordance with the teachings of U.S. Pat. No. 3,707,837.

The fibrillation process of this invention produces a non-bulky yarn approximating a loosely cohered low denier continuous filament yarn in appearance. Without the inclusion of the polypropylene, the polyester tape shatters on fibrillation producing a weak, hairy, fibrous product similar in appearance to the fibrillated yarns disclosed by White in U.S. Pat. Nos. 3,177,557 and 3,242,035. However, the same fibrillation process causes long-running splits in the poly(ethylene terephthalate)/polypropylene tape of this invention producing long, smooth continuous filaments with few, if any, fibrils extending from individual filaments. While the splits in the tape are long-running, they are not endless. Rather, a relatively constant degree of fibrillation is maintained along the length of the tape so that as split terminates along the length of tape in the fibrillation process another will be initiated elsewhere across the tape width maintaining an approximately uniform degree of fibrillation. The coherent tape sections which exist along the length of the tape subsequent to termination of each split and which exist prior to the split initiation elsewhere across the width produce loose coherence in the yarn and are comparable to points of adhesion between two or more individual filaments in a cohered continuous filament yarn.

While fibrillated striated film yarns of the prior art, particularly as exemplified by the teachings of Hall and Kim in U.S. Pat. No. 3,470,685 and related U.S. Pat. Nos. 3,470,285, 3,470,594, 3,494,522 and Reissue No. 27,727 are disclosed as yarns which are bulky and have a plurality of fibrils extending from the main filament sections, the yarn of this invention is of low bulk and has very few, if any, fibrils extending from the main filament sections. This is due to the fact that poly(ethylene terephthalate)/polypropylene tapes split on fibrillation with very long continuous rends whereas the prior art tapes shatter into an open, web-like structure as in Winniger, et al, Costa, et al and White (U.S. Pat. Nos. 3,611,699, 2,980,982 and 3,242,035 respectively). In the case of a striated or ribbed tape both the splitting and the shattering preferably take place in the area of lesser cross-section connecting the ribs. In the case of the poly(ethylene terephthalate)/polypropylene tape this produces long splits dividing the tape into long, relatively smooth continuous filaments whereas the prior art tapes shatter apart between the ribs to produce hairy filaments with numerous fibrils. The side fibrils give these prior art yarns a bulk which is not associated with the yarns of this invention.

When a flat tape is extruded through a slit die the fibrillated product will be low denier yarn comprising long, smooth, flat continuous filaments of varying denier with a trapezoidal cross-section which are similar in overall appearance to conventional continuous filament yarns.

When the tape is extruded through a serrated die as in a preferred embodiment of this invention, a ribbed film is produced which splits randomly along the striations between the ribs to produce a low denier, loosely cohered continuous filament yarn of smooth, low denier, filaments. The yarn comprises filaments of single unit cross-section and filaments of multiple unit cross-section corresponding to single and multiple rib sections of the tape. The filaments of multiple unit cross-section have cross-sections which are whole multiples between 2 and 10 and preferably between 2 and 5 of the single unit cross-section. As splits in the tape terminate and others are correspondingly initiated filaments of unitary or multiple unit cross-section will combine to form filaments of higher multiple unit cross-section while multiple unit cross-section filaments will split to form unitary and/or lower multiple cross-section filaments, respectively, the multiple cross-section filaments in all cases corresponding to areas of adhesion between individual filaments in a conventional continuous filament yarn and thereby providing the loosely coherent structure to the yarn of this invention.

The fibrillated tape yarn of this invention is particularly well suited for conversion into a sewing thread.

In a mechanized sewing operation the thread, while under tension, is guided by the needle through the fabric layers being sewn; the needle then retracts momentarily forming a loop of thread (herein after referred to as the "stitch loop") beneath the fabric layers; the stitch loop is caught by a hook to form a stitch with the bobbin thread and the sewing thread retracts following the needle to start the next stitch.

The formation of the stitch loop is critical to the sewing operation, and the character of the sewing thread heavily influences the formation of a good stitch loop.

A sewing thread must be sufficiently flexible to allow the formation of the stitch loop; it must be cohesive since splaying filaments could catch or snag on the hook; it should not be excessively hairy since hairs would cause friction and dragging on the fabric as the thread passes through to form the stitch loop; it must have low retraction from dynamic loading so that the loop is maintained when the needle retracts; the thread must be balanced to avoid twisting of the stitch loop making it difficult for the hook to catch it.

In conventional prior art sewing thread high twist in the order of 19–21 tpi (twists per inch) is imparted to the yarn to produce a coherent product. The high twist further necessitates a multiple ply thread in order to balance the thread and avoid twist-liveliness which could cause loops and kinks in thread and rotation of the stitch loop from back twisting, any of which can cause missed stitches, poor stitch formation or breakage of the thread line.

Until the development of the fibrillated tape yarn of this invention the only method of producing a low twist sewing thread was to utilize adhesives on the thread in order to increase cohesiveness. Such adhesives usually have the effect, however, of stiffening the yarn and thereby detracting from its ability to form good stitch loops. The adhesives flake off during the sewing operation causing wear and clogging of machine parts.

A single ply of the fibrillated tape yarn of this invention is converted into a cohesive sewing thread equivalent to a balanced multiple ply thread by imparting a low level of twist to the yarn to produce a sewing thread which exhibits excellent stitch loop formation, resistance to splaying, a minimum of loose filaments, and freedom from defects such as slubs and the propensity to knot and snarl.

THE DRAWINGS

For a more complete understanding, a preferred embodiment thereof is hereinafter disclosed with reference to the accompanying drawings in which.

DESCRIPTION OF THE PREFERRED EMBODIMENTS

Figure 1:
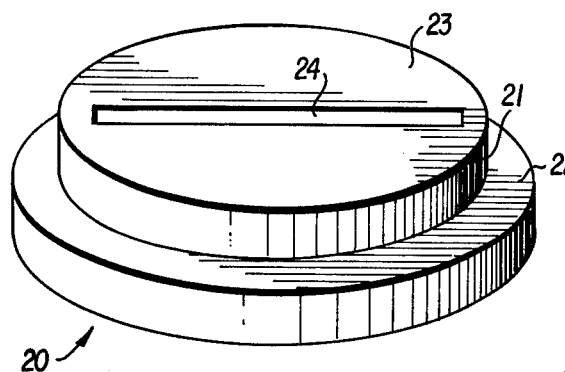
FIG. 1 is a perspective view of the extrusion die according to one embodiment of the present invention.

In the process of this invention a tape essentially comprised of poly(ethylene terephthalate) and a minor amount of polypropylene is extruded, drawn and fibrillated to produce a uniform, coherent yarn suitable for conversion into a sewing thread.

The tape used in this process should be comprised of from about 0.1 to about 20 weight percent of polypropylene. It is more preferred to use from about 0.5 to about 10 percent of polypropylene, and it is most preferred to use from about 2 to about 4 percent of polypropylene.

The mere addition of polypropylene will not, in and of itself, control fibrillation: the polypropylene should be finely and uniformly dispersed throughout the poly(ethylene terephthalate) to produce a fibrillar polypropylene matrix throughout the tape. To produce such a dispersion the average size of the polypropylene particles should be less than about 8 microns, although it is preferred that they be less than about 4 microns, and best results are obtained when they are less than about 1 micron. Many methods well know to the art may be used to obtain the required degree of dispersion.

One method that has been used to obtain the required degree of dispersion is to mix poly(ethylene terephthalate) and polypropylene and extrude the mixture at a high temperature (e.g., about 285°–295° centigrade) through a shear section prior to the slit die. It is believed that, for this method to work well, the viscosities of the poly(ethylene terephthalate) and the polypropylene should be about equal. Polypropylene is relatively non-newtonian, i.e., its viscosity is dependent upon shear rate, whereas poly(ethylene terephthalate) is nearly newtonian in the shear rate range of this process (less than 1000 sec$^{-1}$); thus it is believed that, with the use of the proper conditions, at some stage during the extrusion process the apparent viscosities of the two polymers will be matched. It is believed that, in order to get good dispersion with this method, the following conditions should exist: (1) the poly(ethylene terephthalate) should have an intrinsic viscosity of from about 0.40 to about 0.80, although it is preferred that it has an intrinsic viscosity of from about 0.6 to about 0.67; (2) the polypropylene should have a melt flow index (as measured by ASTM D-1238 62T, condition E or condition L) of from about 8 to about 22, although it is preferred that it have a melt flow index of about 15; (3) a mixture essentially comprised of from about 0.1 to about 20 percent of polypropylene (by weight of poly(ethylene terephthalate)) and poly(ethylene terephthalate) should be prepared; (4) this mixture should be extruded via a pack which imposes a shear force preferably in the range of from about 60 to 150 sec$^{-1}$ and higher for from about 1 to about 2 seconds; and (5) the extrusion temperature should be from about 280° to about 300° centigrade, it being preferred to use an extrusion temperature of about 285°–295° centigrade. Under these conditions good dispersion of polypropylene results. It is to be understood that this is merely one means of obtaining the desired degree of dispersion, and any poly(ethylene terephthalate) tape comprised of the desired amount of polypropylene with the desired degree of dispersion are within the scope of this invention.

The tape is extruded through a slit die at a melt draw down ratio of up to about 75:1. The tape is preferably extruded throught the die slit at a melt draw down ratio of about 50:1. The onset of draw resonance usually occurs between 16:1 and 22:1 draw down ratio for a variety of polymers. It has been surprisingly discovered that by modifying the entry port to the slit of the extrusion die to increase the depth of the slit at both its ends it is possible to extend the maximum melt draw down ratio from about 26:1 to about 60:1 without the occurrence of draw resonance in the tape.

As illustrated in FIG. 1, the die 20 may comprise a generally circular plate 21 having a radially outward extending shoulder 22 toward the upstream end thereof. The shoulder 22 may be used to retain the die in the extrusion apparatus. The downstream face of the die 23 is provided with at least one generally centrally located elongated slit 24 through which the polymer is extruded into a quenching medium.

Figure 2:
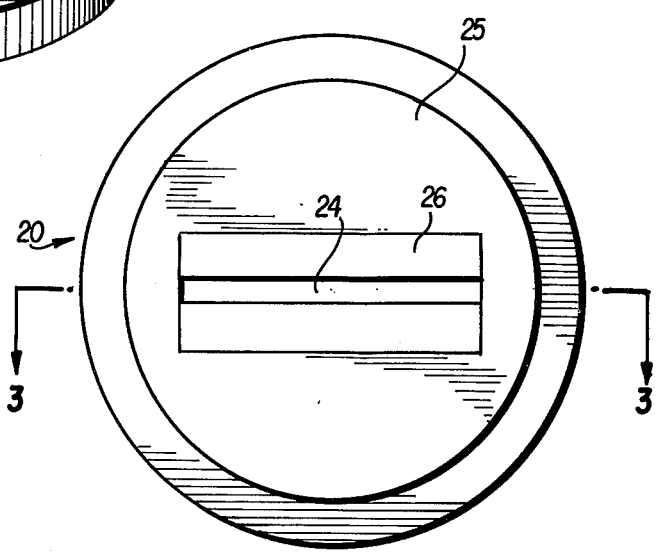
FIG. 2 is a plan view of an extrusion die according to a preferred embodiment of the present invention.

FIG. 2 illustrates the construction of the extrusion die as viewed from the upstream face 25. The upstream face 25 has a diameter somewhat larger than the diameter of the downstream face 23 providing the aforementioned shoulder 22. The upstream face 25 is provided with a generally centrally located elongated entry port 26 which extends to the die slit 24.

Figure 3:
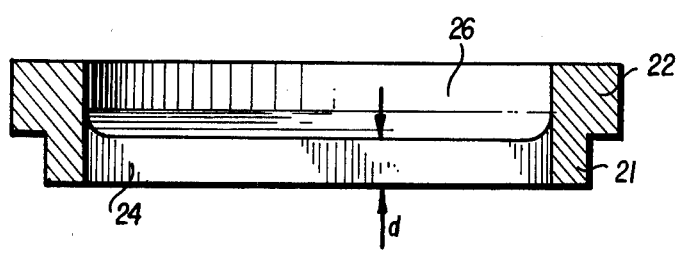
FIG. 3 is a cross-section of the extrusion die of this invention taken along the line 3—3 of FIG. 2.
Figure 4:
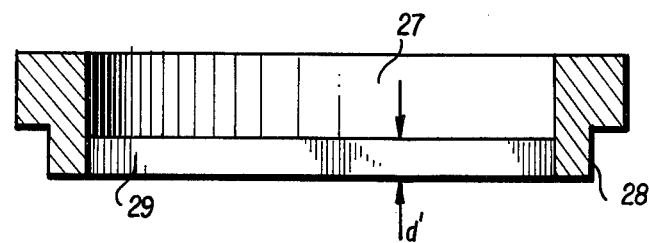
FIG. 4 is a cross-section of a conventional prior art die.

In accordance with the invention herein the entry port 26 is modified as illustrated in FIG. 3, to increase the depth ($d$) of the slit 24 at both its ends. FIG. 4 illustrates the entry port 27 of a conventional slit die 28 having a die slit 29 with a constant depth ($d'$) along the length of the slit.

Figure 5:
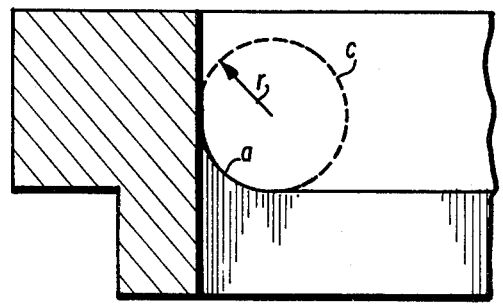
FIG. 5 is an illustration of the preferred method of modifying the die entry port of the die of this invention.

The preferred method of increasing the depth of the slit at both its ends is to "radius" the entry to the slit as shown in FIG. 5 where the depth of the slit is increased along the curve of an arc ($d$) of a circle ($c$) having a given radius ($r$).

When the slit is radiused the radius may be from about 0.05 to about 0.4 times the length of the die slit. For slit length of from about 0.5 to about 1.25 inches a radius for modifying the entry is preferably from about 0.15 to about 0.30.

Although radiusing is the preferred configuration for the entry port any configuration which results in a progressive increase in the slit depth as one proceeds from the center to the end is contemplated by this invention.

The spun tape is from about 0.1 inch to about 0.3 inches wide. The thickness of the tape may be controlled by controlling the dimensions of the die through which it is extruded and/or the quench height (the distance from the die face to the quenching medium). However, it has also been found to be essential to provide a rapid quench after extrusion to stabilize a polypropylene fibrillar matrix into the poly(ethylene terephthalate) tape. It is therefore preferred, when extruding the tape through a slit die which measures about 0.9 inch long to have a slit width of from about 0.003 to about 0.015 inches and to have a quench gap of from about 0.2 to about 2 inches, and it is most preferred to extrude the tape through a slit die measuring about 0.9 inch by about 0.005 inches and to use a quench gap of about 0.5 inches. Any quenching medium can be used. The preferred quenching medium is water, and when it is used the quench temperature (i.e., the temperature of the quench medium) is about 0° to about 60° centigrade, although it is preferred that it be about 20° centigrade. The aforementioned parameters may be varied to obtain the desired tape thickness of from about 0.005 to about 0.02 mm — any of the infinite combination of variables by which one obtains the aforementioned tape thickness is within the scope of applicant's discovery.

After said poly(ethylene terphthalate) tape is extruded and quenched, it may be dried to a moisture of less than about 2% (by weight of tape), although when this step is employed it is preferred to dry the tape to a moisture content of less than about 1%. Drying should be used if a hot air drawing step is employed.

The dried tape is then subjected to a two stage hot draw process which is essential to the production of a fibrillatable tape.

In the first stage the tape is hot drawn to a draw ratio of from about 3.3 to about 4.2 while being subjected to a temperature of from about 80 to about 140° centigrade. It is preferred to draw the poly(ethylene terephthalate) tape in the first stage in saturated or super heated steam. Alternatively the poly(ethylene terephthalate) tape may be drawn in hot water at a preferred hot water drawing temperature of from about 80° to about 100° centigrade. Hot air drawing may also be employed with a preferred hot air drawing temperature of from about 80° to about 140° centigrade.

Thereafter the tape is hot drawn to a total draw ratio of about 5.0 while being heated to above 160° centigrade. This drawing step is preferably carried out over a hot plate at 220° centigrade.

The drawn tape can be fibrillated by any of the processes well known to the art which will provide sufficient stress to fibrillate it. Thus, e.g., the tape may be fibrillated as taught in British Pat. No. 1,118,912 by contacting it with a roller having on its periphery a plurality of grooves of equal pitch and cutting edges of equal pitch disposed substantially in spiral form. Thus, e.g., the tape may be fibrillated as taught in U.S. Pat. No. 3,302,501 by passing it over a stationary brush or a similar shredding means or, alternatively, by piercing the film through its thickness in a plurality of points without shredding the tape by, e.g., moving the piercing means longitudinally or laterally through the tape as it is pierced. Thus, e.g., the tape may be fibrillated as taught in U.S. Pat. No. 3,177,557, by passing it through a zone of high turbulence provided by a high velocity jet of stream of air or other gas.

It is preferred to fibrillate said poly(ethylene terephthalate) tape by a process wherein said tape is subjected to the action of at least four fluid twisting means so that the direction of twist imparted to the tape is completely reversed between adjacent twisting means and there is substantially no change in the longitudinal direction of movement of the tape between successive twisting means.

The fluid twisting means known to the art may be used in this process. Thus, e.g., the fluid twisting means disclosed in abandoned application Ser. No. 563,234 (filed July 6, 1966) may be used. Thus, e.g., the fluid twisting means disclosed in U.S. Pat. No. 2,515,299 (wherein air or water is supplied to a small, cylindrical, receptacle having a central axial passage therethrough through which the textile strand may pass freely, and twist is imparted to the strand by a vortex of whirling fluid which rotates about the axis of travel of the strand in direction contact therewith) works well in applicant's invention.

The most preferred process for fibrillating the tape of this invention is that disclosed in applicant's U.S. Pat. No. 3,707,837 wherein said tape is fibrillated at windup speeds in excess of 500 feet per minute. In this process the tape is subjected to the action of at least four fluid twisting means wherein the direction of twist imparted to the tape is completely and sharply reversed between adjacent twisting means and the tape is advanced from one fluid twisting means to another while being maintained under a tension of from about 0.05 to about 0.5 grams per denier.

Figure 6:
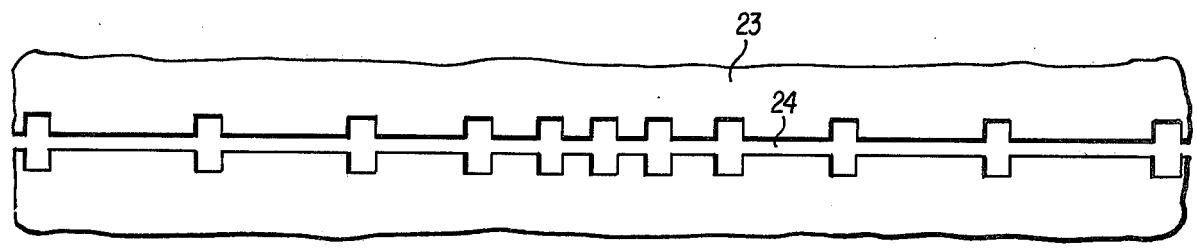
FIG. 6 is an illustration of a section of the serrated slit die of a preferred embodiment of the invention.

In a specific embodiment of this invention the tape to be fibrillated is extruded through a serrated die, one embodiment of which is shown in FIG. 6, to produce a striated tape. The serrations are preferably of uniform size and may be rectangular, triangular or rounded in shape. The tape may be striated on one side only or on both sides.

In extruding the tape through a serrated slit die having a length of from about 0.5 to about 1.0 inch the width of the die at the serrations which generate the rib portions should be from about 0.003 to 0.015 inch and the length of the die between the serrations which generate the web portion should be from about 0.001 to 0.01 inch. In a preferred embodiment the width of the die at the serrations is about 0.015 inch and the width of the die between the serrations is about 0.006 inch. The distance between serrations is greater than 0.005 inch. A uniform spacing of the serrations across the die slit produces a tape at draw down with ribs concentrated towards the edges of the tapes. Fibrillation of such a tape occurs primarily in the center of the tape leaving the edges poorly fibrillated. The most preferred embodiment of this invention is a fibrillated tape yarn with a high degree of fibrillation which is produced by extruding through a slit die wherein the serrations on the slit are spaced approximately inversely to the rib spacing of a drawn down tape extruded through a substantially identical die except with the serrations spaced evenly across the slit.

The design of such a serrated die may be determined by first extruding a tape at the desired operating conditions through a die having a number of serrations of the desired size space equally across the slit at the desired distance of separation. The maximum number of serrations which can be produced is determined by the serration separation necessitated by the machining technique utilized in preparing the die. The drawn tape will have ribs concentrated toward the edges as explained above. The serration spacing is then determined for the desired die by using the inverse of the spacing pattern of the ribs of the drawn tape.

For example, with a 1.0 inch slit die where the minimum width of the serration is 0.005 inch and the web space between serration is 0.005 inch 99 serrations can be equally spaced across the die slit to produce an extruded tape with ribs closer together at the ends than at the center.

The die to produce the tape of the aforementioned preferred embodiment of this invention will then have serrations that are wider apart at the ends than at the center. As a consequence of this wider spacing at the ends there will be fewer serrations across the slit length than in the equally space serrated slit.

For a 1.0 inch slit die with a serration width of 0.005 inch and a minimum web distance between serrations of 0.005 inch a preferred embodiment would have 87 serrations placed as follows across the slit length.

| Serration Number From Center | Space Between Serration | Distance from Center Serration |
|---|---|---|
| 0 to 37 | .005 | .370 |
| 38 | .009 | .384 |
| 39 | .013 | .402 |
| 40 | .017 | .424 |
| 41 | .017 | .446 |
| 42 | .017 | .468 |
| 43 | .017 | .490 |
| END | .005 | .500 |

Figure 7:
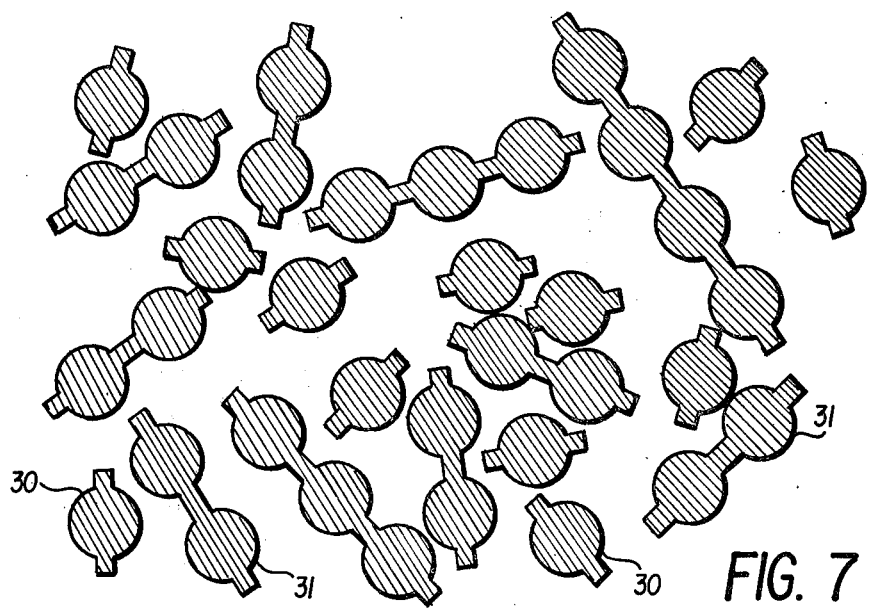
FIG. 7 is a highly magnified view of the cross-section of a preferred low denier fibrillated poly(ethylene terephthalate) yarn of this invention.

The ribbed tape, when drawn in two stages and fibrillated in accordance with the process previously set forth, splits randomly along some of the striations between the ribs in the tape to produce a randomly cohered, low denier continuous filament yarn. FIG. 7 illustrates the cross-section of a typical low denier, low denier per filament poly(ethylene terephthalate) fibrillated tape yarn comprising filaments of single unit cross-section 30 and filaments of multiple unit cross-section 31 wherein the multiple unit cross-section is a whole number multiple of the cross-sectional unit of the single unit cross-section filament. The filaments of multiple unit cross section are whole number multiples between 2 and 10 and perferably between 2 and 5 of the single unit cross-section, in the process of fibrillation long running slits between adjacent ribs will spontaneously terminate and another slit will initiate along the width of the tape between the ribs of a multiple unit cross-section filament. While the location of a slit in the tape will vary along the length of the yarn, the degree of fibrillation of the yarn remains relatively constant along the length of the yarn. The degree of fibrillation is calculated by dividing the number of filaments, both of unitary cross-section and multiple cross-section present in the yarn by the maximum number of unitary cross-section filaments possible from the ribbed tape expressed as a percentage. The yarn of this invention has a degree of fibrillation of from about 20% to about 80% and preferably from about 35% to about 70% and most preferably a degree of fibrillation of from about 50% to about 60%.

In order to better describe some of the preferred embodiments of applicants' inventive process, the below mentioned examples are presented. Unless otherwise mentioned, all parts are by weight and all temperatures are in degrees centigrade.

In Examples 1–5 low denier tapes are produced by using high draw down ratios on tapes extruded through a slit die with the depth of entry at each end of the slit increased as shown in FIG. 1 with a radius of 0.188 inch.

EXAMPLE 1

A mixture of 97% poly(ehtylene terephthalate) (I.V. 0.67) and 3% polypropylene is extruded through a serrated slit die having a length of 0.5 inch and a width of 0.005 inch. Twenty-four rectangularly shaped serrations of 0.015 inches long by 0.005 inches wide are perpendicularly spaced evenly along the slit. The extruded tape is melt drawn at a ratio of 72:1 to produce a tape with a spun denier of 380. No draw resonance occurs.

EXAMPLE 2

The polymer mixture of Example 1 is extruded through a slit die having length of 0.75 inch and a width of 0.005 inch. Perpendicular to the slit forty-two rectangularly shaped serrations of dimensions 0.015 inches long × 0.005 inches wide are spaced 0.010 inch apart at the center of the slit and greater at the edges. The extruded tape is melt drawn at a ratio of 55:1 to produce a tape with a spun denier of 750. No draw resonance occurred.

EXAMPLE 3

The polymer mixture of Example 1 is extruded through a slit die having a length of 1.0 inch and a width of 0.005 inch. Ninety-nine serrations of a generally rounded rectangular shaped and dimension of 0.015 inches long × 0.005 inches wide are perpendicuarly space evenly along the slit. The extruded tape is melt drawn at a ratio of 47:1 to produce a tape with a spun denier of 1550. No draw resonance occurred.

EXAMPLE 4

The polymer mixture of Example 1 is extruded through a slit die having a length of 1.0 inch and a width of 0.005 inch. Twenty-four rectangularly shaped serrations of dimensions of 0.015 inches long × 0.005 inches wide are perpendicularly spaced evenly along the slit. The extruded tape is melt drawn at a ratio 49:1 to produce a tape with a spun denier of 1550. No draw resonance occurred.

EXAMPLE 5

The polymer mixture of Example 1 is extruded through a slit die having a length of 1.25 inch and a width of 0.005 inch. Ninety-nine serrations of a generally rounded rectangular shape and dimension of 0.015 inches long × 0.005 inches wide are perpendiuclarly spaced evenly along the slit. The extruded tape is melt drawn at a ratio of 59:1 to produce a tape with a spun denier of 1600. No draw resonance occurred.

Examples 6–8 exemplify the preparation of the fibrillated tape yarn of this invention.

EXAMPLE 6

A mixture of 0.67 I.V. poly(ethylene terephthalate) and 3% polypropylene (Melt flow index 15) are extruded through a slit die 1.0 inch in length and 0.005 inch wide. The depth of the slit is 0.040 inch at the center and increases in depth at the edges as a result of curving the entry port with a radius of 0.188 inch. The die slit has 80 serrations spaced approximately inversely along the slit to the spacing of ribs which would result on a tape extruded through an evenly serrated die under the same processing conditions. The serrations are perpendicular to the main slit, 0.015 inch long and 0.005 inch wide.

The extruded tape is quenched in water with the water level being positioned about 0.3 inch from the face of the die. The extruded tape is fed to a feed roll at a rate of 300 fpm and has a denier of 1600. This tape is then drawn in saturated steam to about 4 times its original length. Following this drawing step a second stretching operation is carried out over a hot plate at 200° C. giving an overall stretch ratio of 5.35:1. The tape is then relaxed by passing the drawn tape over hot rolls at 215° C. and then onto cold rolls running 6% slower. The relaxed tape moving at 1500 fpm is then fibrillated by passing through adjacent pairs of false twisting air jets and wound up on a winder which provides constant tension to the fibrillating tape. The yarn produced has the following properties:

Denier; 320
Tenacity; 4.85 gpd
Elongation; 16%
Initial Modulus; 75 gpd
Hot Air Shrinkage at 350° F.; 3.5%

This yarn when twisted to 8 tpi (turns per inch) had the appearance of a spun staple yarn with a lustrous but not sparkly appearance.

EXAMPLE 7

A mixture of 97% poly(ethylene terephthalate) (I.V. 0.61) and 3% polypropylene (Melt flow index 15) is extruded through a ¾ inch long slit 0.005 inch wide. Perpendicular to the main slit are 41 serrations 0.015 inch long by 0.005 inch wide having a spacing as given in the following table.

| Serration | Distance from Center Serration (inches) | Slit No. from Center | Distance Serration |
|---|---|---|---|
| 1 | .361 | 21 | .000 |
| 2 | .328 | 22 | .014 |
| 3 | .298 | 23 | .028 |
| 4 | .271 | 24 | .042 |
| 5 | .247 | 25 | .056 |
| 6 | .225 | 26 | .070 |
| 7 | .205 | 27 | .084 |
| 8 | .187 | 28 | .098 |
| 9 | .170 | 29 | .112 |
| 10 | .154 | 30 | .126 |
| 11 | .140 | 31 | .140 |
| 12 | .126 | 32 | .154 |
| 13 | .112 | 33 | .170 |
| 14 | .098 | 34 | .187 |
| 15 | .084 | 35 | .205 |
| 16 | .070 | 36 | .225 |
| 17 | .056 | 37 | .247 |
| 18 | .042 | 38 | .271 |
| 19 | .028 | 39 | .298 |
| 20 | .014 | 40 | .328 |
|  |  | 41 | .361 |

The depth at the center of the main slit is 0.040 but is increased towards the slit edge by curving the entry section with a radius of 0.188 inch. The tape is quenched in water with the water level about 0.2 inch from the die face and the striated tape taken up on to a feed roll at 300 fpm. The yarn is drawn in two stages, the first in steam with a draw ratio of 4:1 and the second on a hot plate at 200° C. with a draw ratio of 1:25:1 for a total stretch ratio of 5:1. The tape is then fibrillated in two pairs of false twist air jets and wound up as 150 denier yarn at 1500 fpm.

The yarn product has the following properties:
Denier; 150
Tenacity; 3.8 gpd
Elongation; 8%
Initial Modulus; 90 gpd It has further been surprisingly found that the aforementioned modification to the extrusion die wherein the depth of the die slit is greater at the ends than at the center, in addition to improving the stability of the extrusion process thereby allowing production of a low denier yarn, also significantly improves the uniformity of fibrillation and strength characteristics of the resulting yarn.

While not wishing to be bound thereby the following is offered as one explanation for this improvement.

Figure 8:
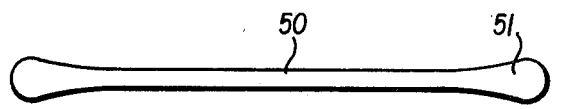
FIG. 8 is an illustration of a polymeric tape as extruded through a conventional rectangular die.

An extrusion process for producing a fibrillatable tape using a conventional rectangular slit die with an unmodified polymer entry produces tapes with a dog-bone shaped cross-section as shown in FIG. 8 with the edges, 51, noticeably thicker than the central portion of the tape, 50.

Such a tape poses two problems. Observation of the tape under polarized light indicates that the thicker edge portions have a noticeably different orientation than the center section. The draw ratio which can be employed in producing the tape is therefore restricted by the higher degree of orientation of the tape edges and the full drawing potential of the central portion of the tape cannot be realized. The obtainable tenacity of the resulting product is therefore limited by the draw ratio restriction of the edge portions.

Figure 9:
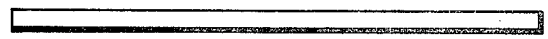
FIG. 9 is an illustration of a polymeric tape as extruded through a rectangular die with an entry port modified in accordance with the invention of this application.

Use of a rectangular slit die, with the contoured polymer entry of this invention produces a tape with a flat, essentially rectangular cross-section, FIG. 9. Such a tape permits higher draw ratios since the orientation, as observed in polarized light, is uniform across the cross-section and lacks the restricting areas of higher orientation present in the tapes produced by a conventional die. Yarn tenacities of 1.0 g.p.d. greater than those produced with a conventional die are obtained using the die of this invention.

In addition to the limitation on draw ratio the thicker edges of the tape are harder to fibrillate than the uniform central portion. As a result the outer portions of the tape fibrillate less than the central portion and the filaments produced from the thickened edges have a higher denier per filament than those produced from the central portion.

The existence of random filaments of higher d.p.f.'s is particularly significant in a fibrillated yarn intended for use as a sewing thread since it is well known that high d.p.f.'s reduce the loop tenacity and make the yarn too stiff for good loop formation which is a critical property in the sewing operation.

A sewing thread product produced from the fibrillated tape yarn of this invention exhibits significantly improved sewing properties when compared to prior art poly(ethylene terephthalate) sewing threads.

Since the fibrillated tape yarn of this invention approximates a continuous filament yarn in physical character it is converted to a sewing thread by merely twisting, dyeing and lubricating with a conventional sewing thread lubricant.

Cotton and poly(ethylene terephthalate) staple must be processed by picking, carding, drafting, roving, spinning and conditioning prior to the twisting operation. Use of the fibrillated tape yarn of this invention obviates the necessity for all these prior processing operations.

Further, the fibrillated tape yarn of this invention exhibits extremely low shrinkage, from about 2.5% to about 3.5% at 350° F. and hence the heat stabilization processes necessary in producing a sewing thread from conventional high shrinkage poly(ethylene terephthalate), both continuous filament and staple products, is not necessary in the production of a sewing thread from the fibrillated tape yarn of this invention.

It has further been surprisingly discovered that a sewing thread equivelant to a balanced multiple ply sewing thread can be produced from a single ply of the fibrillated tape yarn of this invention by imparting level of twist approximately one half of that required for prior art sewing threads of comparable denier.

EXAMPLE 8

A fibrillated poly(ethylene terephthalate) yarn was produced in accordance with Example 6 above and converted to a sewing thread by twisting the yarn 8 twists per inch and applying a commercial sewing thread lubricant. The thread had a shrinkage of 3.0% at 350° F. and therefore did not necessitate heat stabilization. The yarn exhibited a tenacity of 5 grams per denier. A comparable 320 denier, 3 ply poly(ethylene terephthalate) staple yarn was twisted to a twist level of 21 twists per inch and lubricated with a commercial sewing thread lubricant. The thread exhibited a tenacity of 4 grams per denier.

EXAMPLE 9

The poly(ethylene terephthalate)/polypropylene mixture of Example 6 was extruded and quenched as in Example 6. The tape was then drawn in two stages to a total draw ratio of 5.6. In the first stage, the drawing was carried out in steam with a stretch ratio of 4.0. The second stage draw was accomplished on a hot plate maintained at 225° C. The drawn tape was then fibrillated by two sets of false twisting jets and the resulting yarn wound up at 1500 fpm. The fibrillated yarn was then relaxed 6% off a hot roll at 235° C. to a winder which took the yarn up at 1500 fpm. The relaxed yarn was then twisted at 6 tpi and the physical properties compared with commercially available sewing threads (approximately 20 tpi) as follows:

|  | Fibrillated PET Sewing Thread | Cotton Sewing Thread | Polyester Staple Sewing Thread |
|---|---|---|---|
| Denier | 330 | 356 | 352 |
| Tensile lb. | 3.5 | 2.03 | 3.47 |
| Tenacity g/d | 4.93 | 2.58 | 4.47 |
| Elongation | 15.00 | 4.5 | 12.50 |
| Loop Tenacity g/d | 3.87 | 2.47 | 3.35 |
| Shrinkage at 350° F | 1.15 | 1.1 | 5.43 |
| Initial Modulus g/d | 62.5 | 22.0 | 53.70 |

Figure 10:
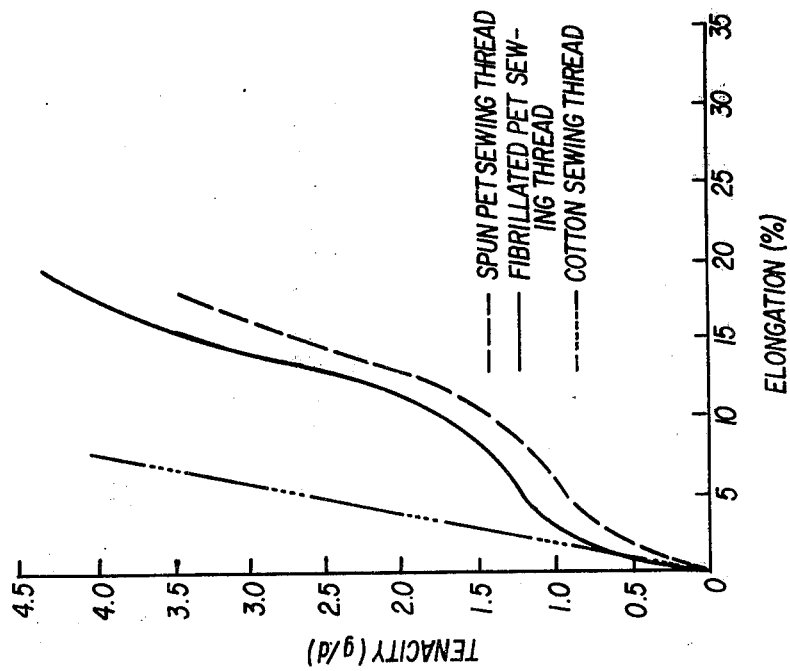
FIG. 10 is a plot of tenacity vs. elongation for a sewing thread of the yarn of this invention, a conventional poly(thylene terephthalate) sewing thread and a cotton sewing thread.

Besides exhibiting higher tenacities than comparable denier poly(ethylene terephthalate) sewing threads the sewing thread of this invention produced from fibrillated poly(ethylene terephthalate) tape yarn exhibit lower elongations under stress than both cotton and spun poly(ethylene terephthalate) sewing threads at tenacities below 1.0 gram per denier and lower elongations at all tenacities than spun poly(ethylene terephthalate). FIG. 10 illustrates the relationship of elongation to tenacity of comparable samples of cotton, spun staple poly(ethylene terephthalate) and fibrillated poly(ethylene terephthalate) tape yarn sewing thread.

As previously mentioned, a single ply fibrillated poly(ethylene terephthalate) tape yarn sewing thread of this invention exhibits good sewing performance at twist levels in the range of one-half the twist levels required of conventional sewing threads of comparable denier to obtain good sewing performance. The advantageous lower twist level is reflected in the lower twist constant of the sewing thread of this invention.

The twist constant is defined as follows:

$$\text{twist constant} = \sqrt{\text{total denier}} \times \text{twists per inch}$$

wherein the twists per inch is the twist levle necessary to produce a satisfactory sewing thread from the denier yarn in question. In determining whether a thread is satisfactory for a sewing operation breakage during sewing, ability to form good stitch loops and resistance to kinking are considered important. The sewing thread of this invention has a twist factor of from about 100 to about 200 and preferably from about 130 to about 160 and most preferably from about 145 to about 155.

The optimum twist level for a sewing thread of this invention is determined as follows:

EXAMPLE 10

A poly(ethylene terephthalate) yarn was prepared as in Example 6. Three samples of the yarn were twisted to twist levels of 6, 8 and 10 tpi, respectively to produce a single ply sewing thread. Each thread was then heat stabilized at 27 psig for 20 minutes. The samples were then dyed at 255° F. for 60 minutes and evaluated together with a comparable commercial three ply spun staple poly(ethylene terephthalate) sewing thread as follows:

|  | 6 tpi | 8 tpi | 10 tpi | Control |
|---|---|---|---|---|
| Denier | 330 | 327 | 336 | 352 |
| Tensile lb. | 3.59 | 3.43 | 3.56 | 3.47 |
| Tenacity gpd | 4.93 | 4.77 | 4.81 | 4.47 |
| Elongation % | 15.0 | 14.6 | 16.9 | 12.5 |
| Loop Tenacity gpd | 3.87 | 3.69 | 3.49 | 3.36 |
| Initial Modulus gpd | 62.5 | 63.2 | 56.2 | 53.7 |
| Shrinkage at 350° F | 1.15 | 0.89 | 0.62 | 6.43 |

The samples were evaluated on union special sewing machines with federal stitch formation #401 and #301. 3 and 4 layers of 9 oz/sq. yd. 50/50 polyester/cotton army twill fabric were sewn at 5,825 stitches/minute. Under these conditions, problems were encountered with the control thread due to breakage. The overall sewability of the fibrillated yarn sewing threads was rated good with best performance obtained with the sample twisted to 8 tpi. The 10 tpi was rated inferior to the 8 tpi thread because of a tendency to kink. The 6 tpi thread was also judged inferior 10 to the 8 tpi thread because of poorer loop formation.

The overall superior sewing performance of a sewing thread of this invention is demonstrated in the following examples:

EXAMPLE 11

A mixture of 0.67 I.V. poly(ethylene terephthalate) and 3% polypropylene (melt flow index 15) are extruded through a slit die 0.9 inch in length and 0.005 inch wide. The depth of the slit is 0.040 inch at the center and increases in depth at the edges as a result of curving the entry port with a radius of 0.188 inch. The die slit has 80 serratioans spaced approximately inversely along the slit to the spacing of ribs which would result on a tape extruded through an evenly serrated die under the same processing conditions. The serrations are perpendicular to the main slit, 0.015 inch long and 0.005 inch wide.

The extruded tape is quenched in water with a water level being positioned about 0.5 inch from the face of the die. The extruded tape is fed to a feed roll at a rate of 330 fpm and has a denier of 978. This tape is then drawn in saturated steam to about 3.5 times its original length. Following this drawing step a second stretching operation is carried out over a hot plate at 215° C. giving an overall stretch ratio of 4.9:1. The tape is then relaxed by passing the drawn tapes over hot rolls at 215° C. and then onto cold rolls running 7.3% slower. The relaxed tape moving at 1500 fpm is then fibrillated by passing through adjacent pairs of false twisting air jets and wound up on a winder which provides constant tension to the fibrillating tape. The yarn produced has the following properties:

Denier; 215
Tenacity; 4.4
Elongation; 15%
Hot Air Shrinkage; 3%

A single ply of this yarn is twisted 10.5 tpi and lubricated with a conventional sewing thread lubricant.

One sample of the thread is dyed at 265° F. for 1 hour. Because of the low shrinkage of the original fibrillated tape yarn no further heat treatment is necessary after the dying operation.

A second sample of the thread, to be twisted without being dyed receives a standard Litzler heat treatment with 0.4% stretch and 0.5% relax with a 10 seconds dwell time.

For comparison purposes two 220 denier single-ply continuous filament poly(ethylene terephthalate) sewing threads are conventtionally lubricated and twisted to a level of 10.5 tpi. One sample receives the standard Litzler heat treatment with 0.4% stretch and 0.5% relax with a 10 second dwell time applied to the aforementioned sample of the sewing thread of this invention while a second sample of this continuous filament thread receives the same Litzler treatment but with a dwell time of 30 seconds.

A further prior art sewing thread is prepared from 220 denier continuous filament poly(ethylene terephthalate) by twisting each of three seventy filament plies to a twist level of 10 tpi and then twisting the three plies together at a twist level of 7 tpi to form the thread. The thread is then treated with a conventional lubricant. One sample of this multiple ply yarn receives the standard Litzler heat treatment with 0.4% stretch, 0.5% relax and 10 seconds dwell time applied to the aforementioned sewing thread of the invention. This sample and a second one, not previously heat treated are both dyed at 265° F. for 1 hour.

Each of the six samples of the sewing thread are tested for sewing performance by threading in both the needle and bobbin positions in a Singer 281-1 sewing machine with a size 14 ball point needle. Two layers of a four ounce per square yard 65/35 polyester/cotton blend fabric are then sewn for twenty yards using a Federal Stitch Formation (FSF) #301 lockstitch, stitching 4500 stitches per minute with four ounces of tension on the sewing thread.

The 20 yards of stitching are examined for thread breakage. Three breaks per 20 yards of stitching is considered an acceptable level of sewability.

The samples tested herein have the following sewing performances.

| Type of Thread | Breaks per 20 yards |
|---|---|
| Fibrillated PET (215d; single ply; 10.5 tpi; dyed only) | None |
| Fibrillated PET (215d; single ply; 10.5 tpi; heat treated only, 10 sec.) | None |
| Continuous Filament PET (220d; single ply; 10.5 tpi; heat treated only, 10 sec.) | 2 |
| Continuous Filament PET (220d; single ply; 10.5 tpi; heat treated only, 30 sec.) | 1 |
| Continuous; Filament PET (three ply; (10×7) tpi; heat treated only, 10 sec.) | 30 |
| Continuous Filament PET (three ply; (10×7) tpi; heat treated, | |

| Type of Thread | Breaks per 20 yards |
|---|---|
| 10 sec.; dyed) | 6 |

From this example it is obvious that the sewing thread of this invention exhibits superior sewing performance to prior art threads of comparable denier and twist level.

EXAMPLE 12

A fibrillated poly(ethylene terephthalate) tape yarn was prepared as in Example 6. This yarn was converted to a sewing thread by twisting to a twist level of 8.5 tpi. This sewing thread was then used to replace the prior commercially accepted sewing thread in a number of different sewing applications.

On both the needle and bobbin positions of a 56300 Union Special sewing machine with Federal Stitch Formation #401 sewing at a rate of 5300 stitches per minute the sewing thread of this example equalled or surpassed the sewing performance of the commercial Coats and Clark's 100/60 Dual Duty Thread usually used on this machine. Using the sewing thread of this example on both the needle and bobbin positions of a Singer 281-22 sewing machine with a Federal Stitch Formation #301 sewing at 5000 stitches per minute only two thread breaks occurred in sewing both the inseams and outseams of 200 pairs of pants which is an excellent sewing performance for any thread in this operation.

When the fibrillated poly(ethylene terephthalate) tape yarn sewing thread of this example replaced a commercial A/3 gassed and mercerized cotton sewing thread on a Reece RPW sewing machine the sewing performance was judged equal or superior to the thread replaced for the same operating conditions.

A further surprising and especially advantageous property is exhibited by a sewing thread produced from the fibrillated tape yarn of this invention.

In many of the numerous end uses of filament polyester and particularly in sewing thread applications, the yarn is subjected to temperatures near or above its normal melting point.

In sewing thread applications, heat is developed as a result of friction between the needle and the material through which it is passing in the mechanical sewing operation, between the needle and the thread as it moves repeated by back and forth through the needle eye and between the material and the thread as the thread passes repeatedly back and forth through the material.

If the amount of heat supplied to the yarn is greater than the heat of fusion plus the heat necessary to raise the yarn from room temperature to its melting temperature, and if the yarn has sufficient time to absorb this heat, it will fuse. Fusion is a particular problem when the sewing operation is halted, and the yarn comes to rest on the hot sewing needle and remains there a sufficient time for the heat from the needle to fuse the thread.

The occurrence of fusion of the filaments can result in weakening of the yarn or even breakage, either during the sewing process or subsequently in use of the sewn article.

The sewing thread of the instant invention has been discovered to be surprisingly resistant to fusion, exhibiting a significant increase in tendency to resist melting in the sewing operation over the previously known poly(ethylene terephthalate) continuous filament and spun staple sewing threads as demonstrated in the following example.

EXAMPLE 13

A fibrillated poly(ethylene terephthalate) sewing thread prepared in accordance with this invention, a conventional poly(ethylene terephthalate) filament yarn sewing thread, a conventional poly(ethylene terephthalate) spun staple sewing thread, and a conventional spun cotton sewing thread having similar denier (200-220) were each tested for resistance to fusion by touching a hanging loop of the sewing thread, with no tension applied, to a ¼ inch hot pin. The pin temperature at the point of contact with the thread was measured by a thermo-couple. The time to initiate melting was measured as a function of temperature.

Figure 11:
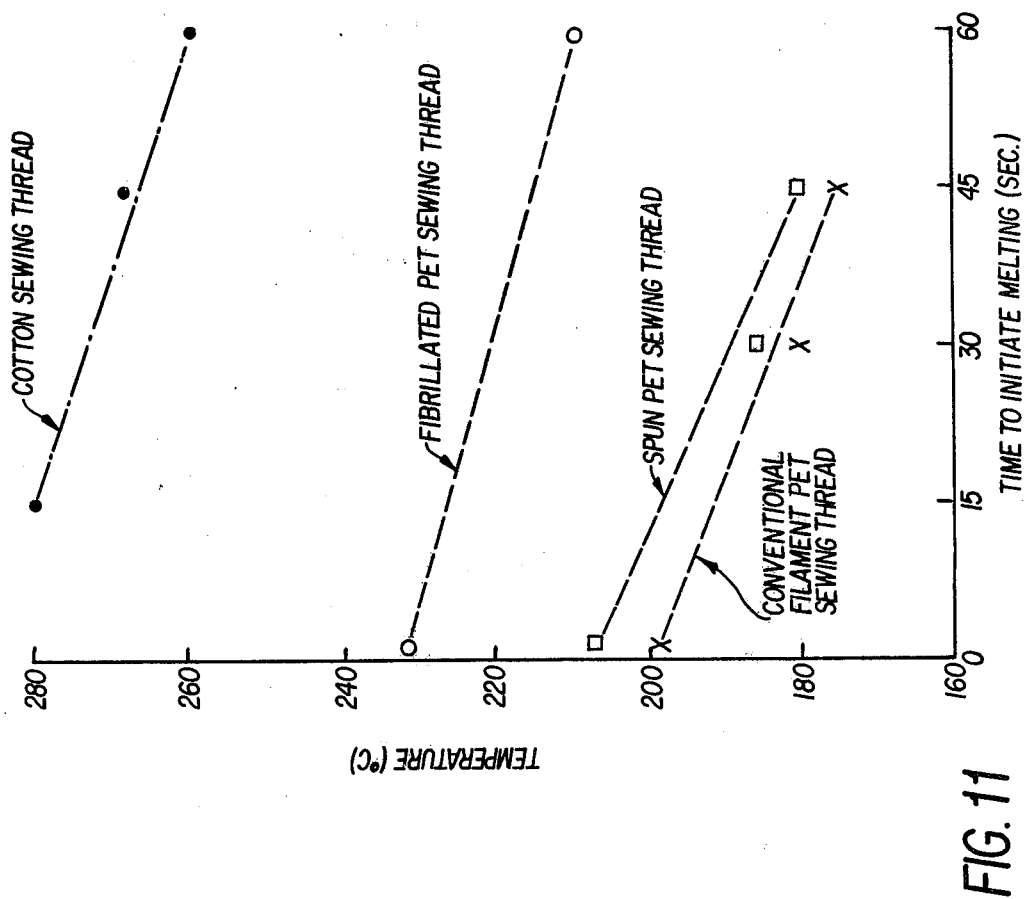
FIG. 11 is a plot of needle temperature vs. the time to initiate meeting of various sewing threads.

The results, as shown in FIG. 11, indicate that the fibrillated sewing thread of this invention is able to withstand higher needle temperature for longer periods of time prior to the initiation of fusion than the conventional filament and spun staple threads of poly(ethylene terephthalate) making it similar in this property to a cotton sewing thread which does not fuse but is subject to discoloration and eventually charring from contact with the hot pin.

This increase in the tendency to resist melting is believed attributable in part to an increase in the heat capacity and enthalpy of the fibrillated tape sewing thread of this invention.

The increase in specific heat and enthalpy is believed to be a result of the novel structure of the poly(ethylene terephthalate) fibrillated yarn resulting from the process of this invention.

The addition of polyprolylene, with a higher specific heat and enthalpy than poly(ethylene terephthalate), to the precursor poly(ethylene terephthalate) extrudate of this invention is believed to contribute to the increase in the specific heat and enthalpy of the resulting fibrillated tape yarn. However, the increased specific heat and enthalpy is surprisingly far in excess of that which would have been expected from the mere addition of a material with a higher specific heat and enthalpy. It is therefore believed that the addition of the polypropylene together with the other critical operation parameters which are disclosed as producing the novel poly(ethylene terephthalate) fibrillated sewing thread of this invention are responsible for the unique property of the thread of this invention since the addition of the polypropylene, the die slot entrance configuration, as well as the defined operation parameters are responsible for the novel structure of the sewing thread.

This surprising and unexpected increase in the specific heat and enthalpy of the sewing thread yarn of this invention is illustrated by the following examples;

EXAMPLE 14

A poly(ethylene terephthalate) fibrillated tape sewing thread was prepared in accordance with Example 7 containing 3% polyproplylene.

The theoretical specific heat for such a yarn can be determined according to the following equations:

$$C_p \text{ (FTY)} = \text{(weight fraction PP)} \times C_p \text{ (PP)} + \text{(weight faction PET)} \times C_p \text{ (PET)}$$

wherein

Cp (FTY) is the theoretical specific heat of the fibrillated tape yarn
PP is polypropylene
PET is poly(ethylene terephthalate)
Cp (PP) is the specific heat of polypropylene
Cp (PET) is the specific heat of poly(ethylene terephthalate).

The actual specific heat of the fibrillated sewing thread was determined by differential scanning calorimetry as was the actual specific heat of a conventional poly(ethylene terephthalate) continuous filament sewing thread of comparable denier. At 100° C. the specific heat of polyprophylene is 0.53 cal $g^{-1}$ $deg^{-1}$ and the specific heat of poly(ethylene terephthalate) is 0.35 cal $g^{-1}$ $deg^{-1}$, and the theoretical specific heat of the fibrillated yarn is calculated to be 0.355 cal $g^{1}$ $deg^{-1}$ as follows:

Cp (FTY) = 0.03 Cp(PP) + 0.97 Cp (PET) = 0.03 (0.53) + 0.97 (0.35) + 0.355 cal $g^{-1}$ $deg^{-1}$ The actual specific heat for the fibrillated yarn as determined by differential scanning calorimetry is 0.375 cal $g^{-1}$ $deg^{-1}$. The expected increase in specific heat due to the inclusion of 3% polypropylene is 0.005 Cal $g^{-1}$ $deg^{-1}$ while the actual increase determined by differential scanning calorimetry is 0.025 cal $g^{-1}$ $deg^{-1}$ which represents a 7.1% increase in specific heat, five times that which would be expected from the addition of 3% polypropylene.

EXAMPLE 15

A poly(ethylene terephthalate) fibrillated tape sewing thread was prepared in accordance with Example 7 using 2.9% polypropylene with 97.5% poly(ethylene terephthalate).

Five independent determinations of the specific heat (Cp) of the fibrillated tape yarn were made by differential scanning calorimetry at five degree intervals from 60° C. to 240° C. using the procedure described in Example 10. Five independent determinations were likewise made on a continuous filament poly(ethylene terephthalate) sewing thread of comparable denier. The continuous filament yarn was spun at 2550 feet per minute from 0.675 IV polymer chip; drawn at a draw ratio of 5.26:1.00 at 230° C. and heat relaxed 8%. The results of the differential scanning calorimetry measurements are set out below in Tables 1 and 2 together with the average values of specific heat (Cp) for each temperature.

TABLE I

Specific Heat of Poly(ethylene terephthalate) Fiberillated Tape Sewing Thread Containing 2.9 Weight % Polypropylene

| Temp. ° C | Cp(I) | Cp(II) | Cp(III) | Cp(IV) | Cp(V) | Cp(cal $g^{-1}K^{-1}$) |
|---|---|---|---|---|---|---|
| 60 | .321 | .320 | .325 | .312 | .320 | .317 |
| 65 | .330 | .330 | .320 | .317 | .330 | .325 |
| 70 | .331 | .331 | .320 | .326 | .336 | .330 |
| 75 | .340 | .335 | .330 | .36 | .337 | .334 |
| 80 | .348 | .334 | .336 | .330 | .343 | .338 |
| 85 | .355 | .344 | .335 | .332 | .347 | .343 |
| 90 | .364 | .353 | .334 | .335 | .353 | .348 |
| 95 | .370 | .353 | .340 | .337 | .357 | .351 |
| 100 | .376 | .356 | .346 | .350 | .368 | .361 |
| 105 | .383 | .358 | .364 | .358 | .379 | .368 |
| 110 | .394 | .375 | .372 | .367 | .376 | .377 |
| 115 | .400 | .483 | .370 | .367 | .378 | .380 |
| 120 | .409 | .382 | .374 | .368 | .382 | .383 |
| 125 | .411 | .391 | .382 | .376 | .391 | .390 |
| 130 | .415 | .397 | .389 | .384 | .399 | .397 |
| 135 | .421 | .404 | .400 | .394 | .406 | .405 |
| 140 | .422 | .412 | .409 | .407 | .425 | .415 |
| 145 | .442 | .434 | .425 | .421 | .444 | .433 |
| 150 | .473 | .443 | .465 | .430 | .454 | .453 |
| 155 | .477 | .468 | .450 | .445 | .489 | .466 |
| 165 | .449 | .458 | .443 | .442 | .484 | .456 |
| 170 | .451 | .440 | .426 | .419 | .469 | .441 |
| 175 | .459 | .449 | .432 | .429 | .473 | .448 |
| 180 | .470 | .453 | .437 | .434 | .485 | .456 |
| 185 | .503 | .454 | .446 | .443 | .492 | .468 |
| 190 | .488 | .461 | .451 | .445 |  | .466 |
| 195 | .493 | .484 | .468 | .457 | .498 | .480 |
| 200 | .503 | .491 | .458 | .462 | .494 | .482 |
| 205 | .511 | .484 | .464 | .465 | .493 | .483 |
| 210 | .515 | .491 | .464 | .459 | .490 | .484 |
| 215 | .530 | .493 | .464 | .459 | .498 | .489 |
| 220 | .536 | .498 | .469 | .465 | .504 | .494 |
| 225 | .550 | .514 | .477 | .469 | .516 | .505 |
| 230 | .579 | .526 | .490 | .478 | .520 | .519 |
| 235 | .617 | .554 | .515 | .495 | .563 | .549 |
| 240 | .691 | .590 | .553 | .563 | .596 | .593 |

TABLE 2

Specific Heat of Poly(ethylene terephthalate) Filament Sewing Thread

| Temp. ° C | Cp(I) | Cp(II) | Cp(III) | Cp(IV) | Cp(V) | Cp(cal $g^{-1}K^{-1}$) |
|---|---|---|---|---|---|---|
| 60 | .309 | .317 | .312 | .308 | .314 | .312 |
| 65 | .319 | .321 | .313 | .318 | .322 | .319 |
| 70 | .323 | .325 | .323 | .322 | .329 | .324 |
| 75 | .327 | .328 | .326 | .320 | .335 | .327 |
| 80 | .330 | .331 | .329 | .322 | .329 | .328 |
| 85 | .333 | .332 | .331 | .333 | .337 | .333 |
| 90 | .336 | .337 | .334 | .338 | .338 | .337 |
| 95 | .339 | .340 | .334 | .343 | .342 | .340 |
| 100 | .344 | .344 | .338 | .344 | .340 | .341 |
| 105 | .359 | .358 | .343 | .365 | .343 | .354 |
| 110 | .365 | .360 | .343 | .364 | .358 | .358 |
| 115 | .383 | .353 | .365 | .359 | .363 | .365 |
| 120 | .360 | .354 | .356 | .366 | .373 | .362 |
| 125 | .367 | .358 | .357 | .371 | .358 | .362 |
| 130 | .376 | .361 | .360 | .374 | .367 | .368 |
| 135 | .381 | .370 | .363 | .383 | .372 | .374 |
| 140 | .388 | .377 | .373 | .388 | .380 | .381 |
| 145 | .407 | .412 | .379 | .393 | .396 | .397 |
| 150 | .409 | .419 | .386 | .411 | .399 | .405 |
| 155 | .405 | .415 | .390 | .407 | .396 | .403 |
| 160 | .410 | .410 | — | .412 | .404 | .409 |
| 165 | .413 | .417 | — | .417 | .411 | .415 |
| 170 | .421 | .424 | — | .417 | .416 | .420 |
| 175 | .429 | .425 | — | .427 | .424 | .426 |
| 180 | .437 | .434 | .428 | .430 | .430 | .432 |
| 185 | .454 | .438 | .427 | .437 | .432 | .438 |
| 190 | .445 | .447 | .422 | .438 | .443 | .439 |
| 195 | .462 | .469 | .422 | .440 | .461 | .451 |
| 200 | .453 | .470 | .426 | .453 | .466 | .454 |
| 205 | .441 | .460 | .426 | — | .442 | .442 |
| 210 | .439 | .457 | .434 | — | .447 | .444 |
| 215 | .449 | .465 | .441 | — | .455 | .453 |
| 220 | .452 | .479 | .449 | — | .468 | .462 |
| 225 | .461 | .492 | .459 | — | .482 | .474 |
| 230 | .476 | .510 | .473 | — | .499 | .490 |
| 235 | — | .538 | — | — | .527 | .533 |
| 240 | — | .577 | — | — | .561 | .569 |

Comparison of the specific heat (Cp) values for the two sewing threads shows that the heat capacity of the fibrillated tape sewing thread is, on the average, 6% higher than the corresponding values for the conventional poly(ethylene terephthalate) continuous filament sewing thread.

Figure 12:
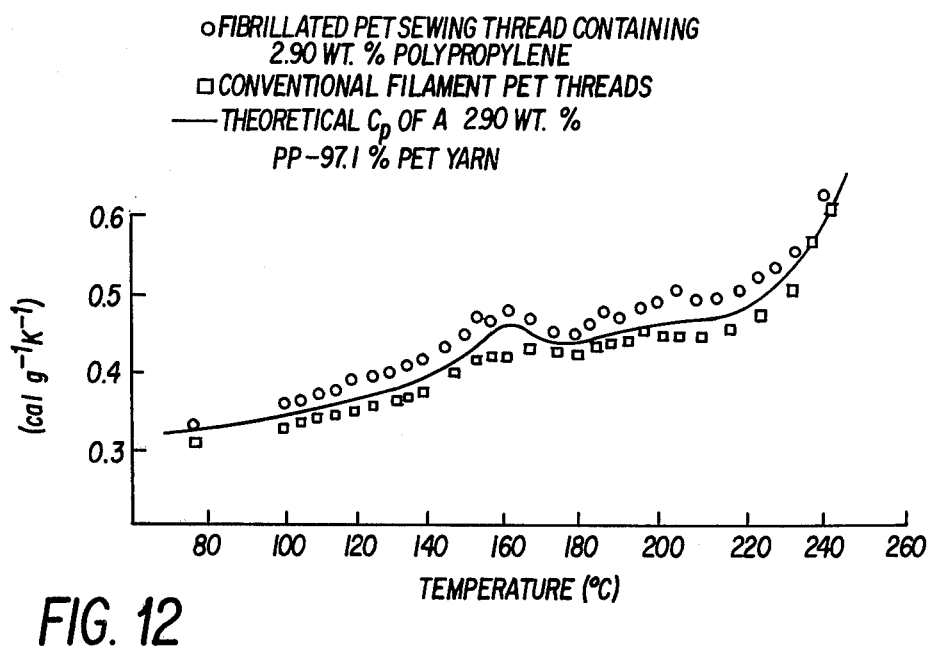
FIG. 12 is a plot of specific heat of a sewing thread of the yarn of this invention and a conventional poly(ethylene terephthalate) sewing thread.

This specific heat difference can also be qualitatively seen in the specific heat capacity versus temperature plot in FIG. 12.

Figure 13:
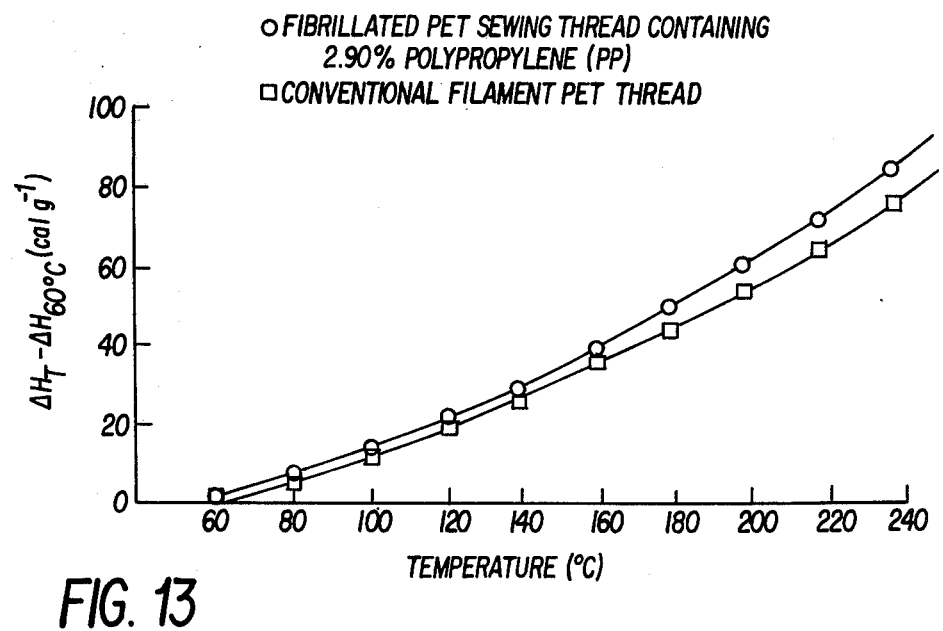
FIG. 13 is a plot of enthalpy of a sewing thread of the yarn of this invention and a conventional poly(ethylene terephthalate) sewing thread.

Although the specific heat of the polymers is the experimental measured quantity, the enthalpy or heat content as determined by the area under the specific heat versus temperature plot, is of importance in the consideration of the amount of heat which the particular thread system can absorb before fusion. Thus, a comparison of the heat content ($_\Delta H_T - _\Delta H_{600}$) of the fibrillated tape yarn sewing thread and the conventional poly(ethylene terephthalate) sewing thread of Example 11 as set forth in FIG. 13 shows that if, for example, 70 calories of thermal energy is supplied to 1 gram of the respective sewing threads, the conventional poly(ethylene terephthalate) yarn would achieve a temperature of 229° C., while the fibrillated tape yarn of this invention would reach only 217° C.

What is claimed is:

1. A method of producing a low denier, high tenacity relatively uniformly fibrillatable poly(ethylene terephthalate) tape comprising
   a. intimately mixing poly(ethylene terephthalate) polymer with from about 0.1 to about 20 percent based on the weight of poly(ethylene terephthalate) of polypropylene,
   b. extruding said polymer mixture in the form of a tape at a melt draw down of from about 26:1 to about 75:1 through a slit die characterized by having a modified entry port wherein the depth of the slit is greater at both ends than at the middle by an amount equal to 0.1 to 0.4 times said slits length,
   c. quenching said tape,
   d. hot drawing said tape in two stages wherein said tape is initially hot drawn to a draw ratio of from about 3.1:1 to about 4.2:1 while being subjected to a temperature of from about 80° to about 140° centigrade and thereafter hot drawn to a total draw ratio of about 5.0:1 while being heated to a temperature above 160° centigrade.

2. The method of claim 1 wherein the polymer is extruded through the modified slit die at a melt draw down ratio of about 35:1 to about 55:1.

3. The method of claim 1 wherein the polymer is extruded through the modified slit die at a melt draw down ratio of about 50:1.

4. The method of claim 1 wherein the tape is hot drawn in the second stage at a temperature from about 160° to about 230° centigrade.

5. The method of claim 1 wherein from about 0.5 to about 10 percent polypropylene is intimately mixed with the poly(ethylene terephthalate).

6. The method of claim 1 wherein from about 2 to about 4 percent polypropylene is intimately mixed with the poly(ethylene terephthalate).

7. The method of claim 1 which comprises extruding said polymer mixture through a slit die radiused at both ends of said die's entry port.

8. The method of claim 1 which comprises extruding said polymer mixture through a slit die radiused at both ends of said die's entry port and having a radius of about 0.2 times said slit's length.

9. A method of producing a low denier, high tenacity relatively uniformly fibrillated poly(ethylene terephthalate) tape yarn comprising
   a. intimately mixing poly(ethylene terephthalate) polymer with from about 0.1 to about 20 percent based on the weight of poly(ethylene terephthalate) of polypropylene,
   b. extruding said polymer mixture in the form of a tape at a melt draw down of from about 26:1 to about 75:1 through a slit die characterized by having a modified entry port wherein the depth of the slit is greater at both ends than at the middle,
   c. quenching said tape,
   d. hot drawing said tape in two stages wherein said tape is initially hot drawn to a draw ratio of from about 3.1:1 to about 4.2:1 while being subjected to a temperature of from about 80° to about 140° centigrade and thereafter hot drawn to a total draw ratio of about 5.0:1 while being heated to a temperature above 160° centigrade,
   e. fibrillating the drawn tape.

10. The method of claim 9 wherein the polymer is extruded through the modified slit die at a melt draw down of about 35:1 to about 55:1.

11. The method of claim 9 wherein the polymer is extruded through the modified slit die at a melt draw down of about 50:1.

12. The method of claim 9 wherein the tape is hot drawn in the second stage at a temperature from about 160° to about 230° centigrade.

13. The method of claim 9 wherein from about 0.5 to about 10 percent polypropylene is intimately mixed with the poly(ethylene terephthlate).

14. The method of claim 9 wherein about 3.0 percent polypropylene is intimately mixed with the poly(ethylene terephthlate).

15. The method of claim 9 wherein the tape is fibrillated by use of two sets of false twisting jets.

16. The method of claim 9 wherein the slit die is serrated along at least one face.

17. The method of claim 9 wherein the slit die is serrated along both faces and the serration of each face are aligned opposite each other.

* * * * *